(12) United States Patent
Eggert et al.

(10) Patent No.: US 7,236,961 B2
(45) Date of Patent: Jun. 26, 2007

(54) SIMULATION OF CONVOLUTIONAL NETWORK BEHAVIOR AND VISUALIZING INTERNAL STATES OF A NETWORK

(75) Inventors: Julian Eggert, Offenbach/Main (DE); Berthold Bäuml, Wessling (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 794 days.

(21) Appl. No.: 10/099,364

(22) Filed: Mar. 12, 2002

(65) Prior Publication Data
US 2003/0028359 A1    Feb. 6, 2003

(30) Foreign Application Priority Data
Mar. 15, 2001   (EP) ................................. 01106567

(51) Int. Cl.
G06F 15/00     (2006.01)
G06F 17/00     (2006.01)
G06N 3/10      (2006.01)
(52) U.S. Cl. ............................... 706/44; 706/14; 706/26
(58) Field of Classification Search ................. 706/44, 706/14, 26; 382/100, 232
See application file for complete search history.

(56) References Cited

U.S. PATENT DOCUMENTS

2001/0019630 A1 * 9/2001 Johnson ...................... 382/232
2001/0055407 A1 * 12/2001 Rhoads ....................... 382/100

OTHER PUBLICATIONS

Steve Lawrence et al, Face Recognition: A Convolutional Neural-Network Approach, 1997, IEEE, 1045-9227/97, 98-113.*
Claus Neubauer, Evalution of Convolutional Neural Networks for Visual Recognition, 1998, IEEE, 1045-9227/98, 685-696.*
European Search Report, EP 01 10 6567, Sep. 14, 2001, 4 pages.
Steve Lawrence et al., "Face Recognition: A Convolutional Neural-Network Approach", IEEE Transactions on Neural Networks, vol. 8, No. 1, pp. 98-113, Jan. 1997.
Yann Le Cun and Yoshua Bengio, "Word-Level Training of a Handwritten Word Recognizer Based on Convolutional Neural Networks", IEEE, pp. 88-92, 1994.
E. Cosatto and H.P. Graf, "Net32K High Speed Image Understanding System", IEEE, pp. 413-421. 1994.
Ebrahim Soujeri and Hüseyin Bilgekul, "Hopfield Neural Network and Viterbi Decoding for Asynchronous MC-CDMA Communication Systems", The 12th International Conference on Microelectronics, Tehran, pp. 215-218, Nov. 2, 2000.
Claus Neubauer, "Evalution of Convolutional Neural Networks for Visual Recognition", IEEE Transactions on Neural Networks, vol. 9, No. 4, pp. 685-696, Jul. 1998.

* cited by examiner

Primary Examiner—Joseph P Hirl
(74) Attorney, Agent, or Firm—Fenwick & West LLP

(57) ABSTRACT

Convolutional networks can be defined by a set of layers being respectively made up by a two-dimensional lattice of neurons. Each layer—with the exception of the last layer—represents a source layer for respectively following target layer. A plurality of neurons of a source layer called a source sub-area respectively share the identical connectivity weight matrix type. Each connectivity weight matrix type is represented by a scalar product of an encoding filter and a decoding filter. For each source layer a source reconstruction image is calculated on the basis of the corresponding encoding filters and the activities of the corresponding source sub-area. For each connectivity weight matrix type, each target sub-area and each target layer the input of the target layer is calculated as a convolution of the source reconstruction image and the decoding filter. For each target layer the activities are calculated by using the non-linear local response function of the neurons of the target layer and the calculated input of the target layer.

26 Claims, 5 Drawing Sheets

SIMULATION OF CONVOLUTIONAL NETWORK BEHAVIOR AND VISUALIZING INTERNAL STATES OF A NETWORK

CROSS-REFERENCE TO RELATED APPLICATIONS

This application is related to and claims priority from European Patent Application No. 01 106 567.9 filed on Mar. 15, 2001.

FIELD OF THE INVENTION

The underlying invention generally relates to the field of neural networks and more particularly to the behavior of a convolutional network. The present invention relates to a method for the simulation of a convolutional network behavior, to a method for visualizing internal states of a network, to a computer software program for implementing such a method as well as to the use of such methods for pattern recognition.

BACKGROUND OF THE INVENTION

A plurality of problems are usually encountered when dealing with biologically realistic connectionist networks. First, in case connections are not learned statistically, they have to be defined holistically as connecting two points in some high-dimensional neuronal feature space, which is an almost impossible task. Second, due the high dimensionality it is difficult to interpret and visualize the internal states of a network during simulations. Furthermore, the simulation (both memory and performance) of such networks are mainly determined by the number of connections.

The present invention particularly targets at convolutional networks, i.e. having layers with sub-areas, wherein neurons of a sub-area of a layer of the network share a common connectivity weight matrix. The main problems encountered with convolutional networks are the extensive calculation of the dynamics using the shared connections, the non-intuitive design of the connection patterns and the difficult handling of the results. Local dynamic normalization procedures further increase the computational overhead. Finally, a visualization of the network state (i.e. its activity) occurs in a multi-dimensional space.

SUMMARY OF THE INVENTION

In view of the above-captioned problems encountered with convolutional networks it is the object of the present invention to reduce simulation costs and to provide for a better access to an understanding of the network's activity, including intuitive visualization possibilities.

Said object is achieved by means of the features of the independent claims. The dependent claims develop further the central idea of the present invention.

According to a first aspect of the present invention a method for the simulation of a convolutional network behavior is proposed. The convolutional network is defined by a set of layers respectively made up of a two-dimensional lattice of neurons. Each layer but the last layer of the network represents a source layer for a respectively following target layer. A plurality of neurons of a source layer called a source sub-area share the identical connectivity weight matrix type (weight sharing technique for convolutional networks). The connectivity weight matrix type can be represented by a scalar product of an encoding filter and a decoding filter such that the communication of the driving signal from a source layer (activity of the source layer) to the respective target layer is decomposed into an encoding filter step and a decoding filter step.

The encoding filter step can comprise the step of calculating a source reconstruction image on the basis of the encoding filters and the activities of the source layer. The decoding filter step can comprise the step of calculating the input to a target layer by means of a convolution of the source reconstruction image and the decoding filters.

The source reconstruction image can be calculated by taking the scalar product of each of the source sub-areas and the corresponding encoding filter and combining the results of the scalar products of all source sub-areas.

The encoding filters and/or the decoding filters can be preset or generated by a learning process.

Advantageously, the encoding filter step and/or the decoding filter step can be performed by means of a Fast Fourier transformation (FFT).

The encoding filters and the decoding filters can respectively extend along an axis along which the corresponding connectivity weight matrix type presents a translational invariance.

A further aspect of the present invention relates to a method for visualizing internal states of a network using a method as set forth above. The internal states of the network thereby are visualized by a source reconstruction image for each connection between a source layer and a following target layer, each reconstruction image being calculated on the basis of the encoding filters and the activities of the corresponding source layer.

Each source reconstruction image can thereby be calculated by taking the scalar product of each of the source sub-areas of the source layer and the corresponding encoding filter followed by a combination of the results of the scalar products of all source sub-areas.

According to a still further aspect another method for the simulation of the convolutional network behavior is proposed. The convolutional network is defined by a set of layers. Each layer is made up of a two-dimensional lattice of neurons. Each layer with the exception of the last layer thereby represents a source layer for a respectively following target layer. A plurality of neurons of a source layer called a source sub-area respectively share the identical connectivity weight matrix type. According to the invention each connectivity weight matrix type is represented by a scalar product of an encoding filter and a decoding filter. For each source layer a source reconstruction image is calculated on the basis of the corresponding encoding filters and the activities of the corresponding source sub-area. For each connectivity weight matrix type, each target sub-area and each target layer the input of the target layer is calculated as a convolution of the source reconstruction image of the preceding source layer and the decoding filter. Finally, for each target layer the activities of the target layer are calculated by using the response function of the neurons of the target layer and the calculated input of the target layer.

Each source reconstruction image can be calculated by the scalar product of each of the source sub-areas of the corresponding source layer and the corresponding encoding filter followed by a combination of the results of the scalar product of all source sub-areas.

According to a further aspect of the present invention a computer software program is proposed implementing such a method when run on a data processing device.

Finally the use of such a method for pattern recognition (robots, etc.) is proposed.

DESCRIPTION OF THE DRAWINGS

Further advantages, features and objects of the present invention will become evident for the man skilled in the art when reading the following detailed explanation of an embodiment of the present invention taken in conjunction with the figures of the enclosed drawings.

DETAILED DESCRIPTION OF THE PREFERRED EMBODIMENTS

Figure 2:
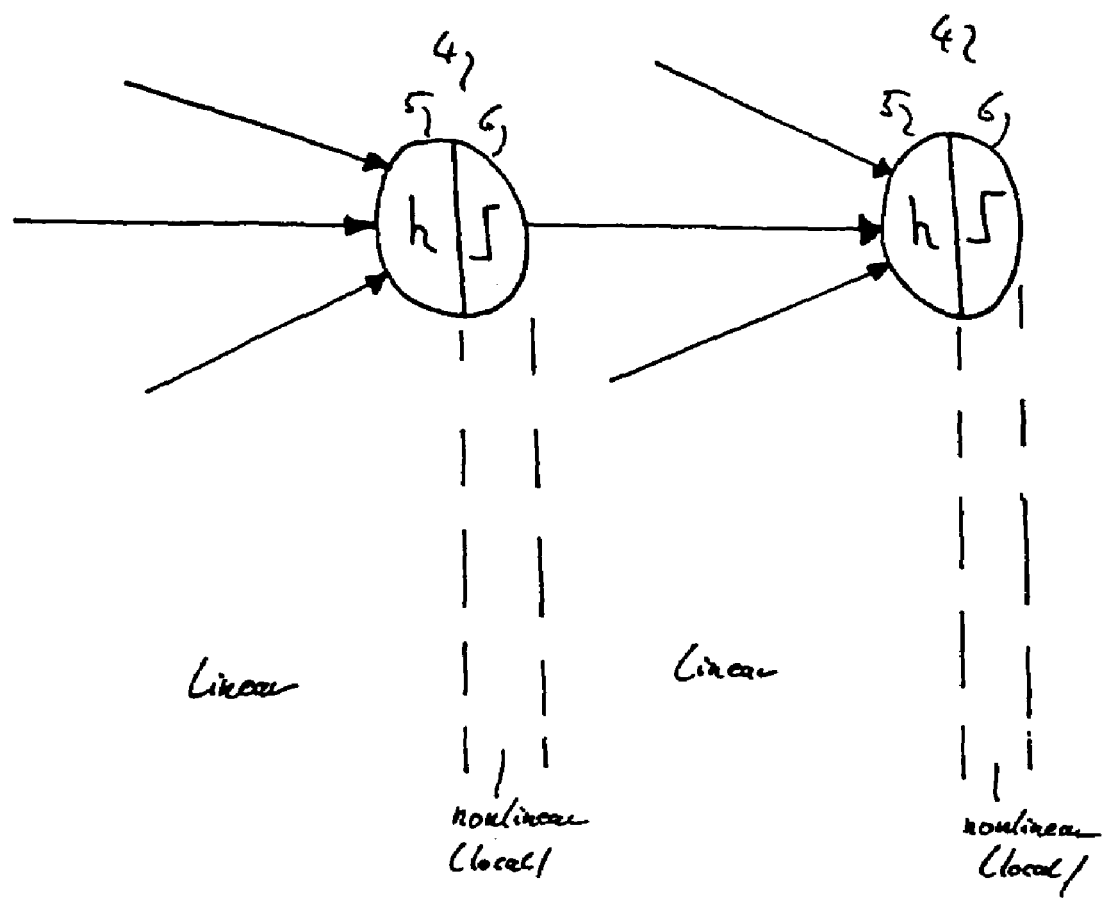
FIG. 2 shows the separation of non-linear and linear steps when calculating a network behavior.
Figure 3:
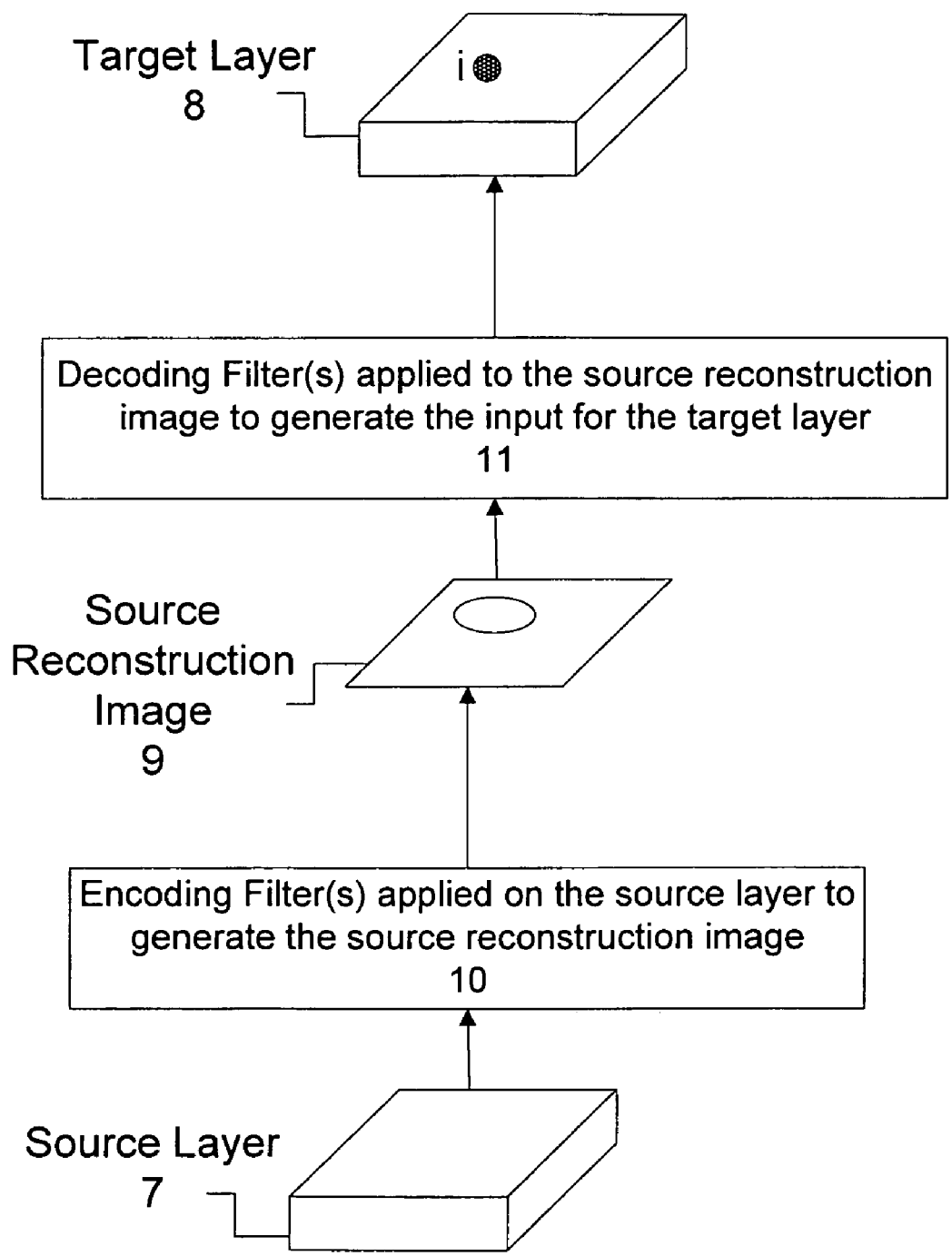
FIG. 3 shows the decomposition of the connectivity between a source layer and a target layer by means of encoding filters, source reconstruction images and decoding filters.

At first the theoretical background of the present invention will be explained with reference to FIGS. 1 to 3.

Common to most of the neural networks 12 made up of several layers 1, 2, 3 is that at some part of the evaluation of the activities $A_i(t)$ of the neurons 4, the contributions $A_j(t)$ of the incoming signals from all source neurons $j$ to a target neuron $i$ (see FIG. 1) are added linearly using a weight matrix $J_{i,j}$ to result in a single scalar $h_i(t)$, $$h_i(t) = \sum_j J_{i,j} A_j(t) \tag{1}$$

The neuronal indices $i, j$ enumerate all neurons in a unique way. E.g., if an input space (also called "feature space" in the following) is sampled in a discrete manner using localized portions of the space, then the indices may indicate uniquely which portion a neuron is sensitive to. Similarly, in a high-dimensional feature space $i$ and $j$ can be thought of not as single indices, but as each of them being composed of several subindices.

Figure 1:
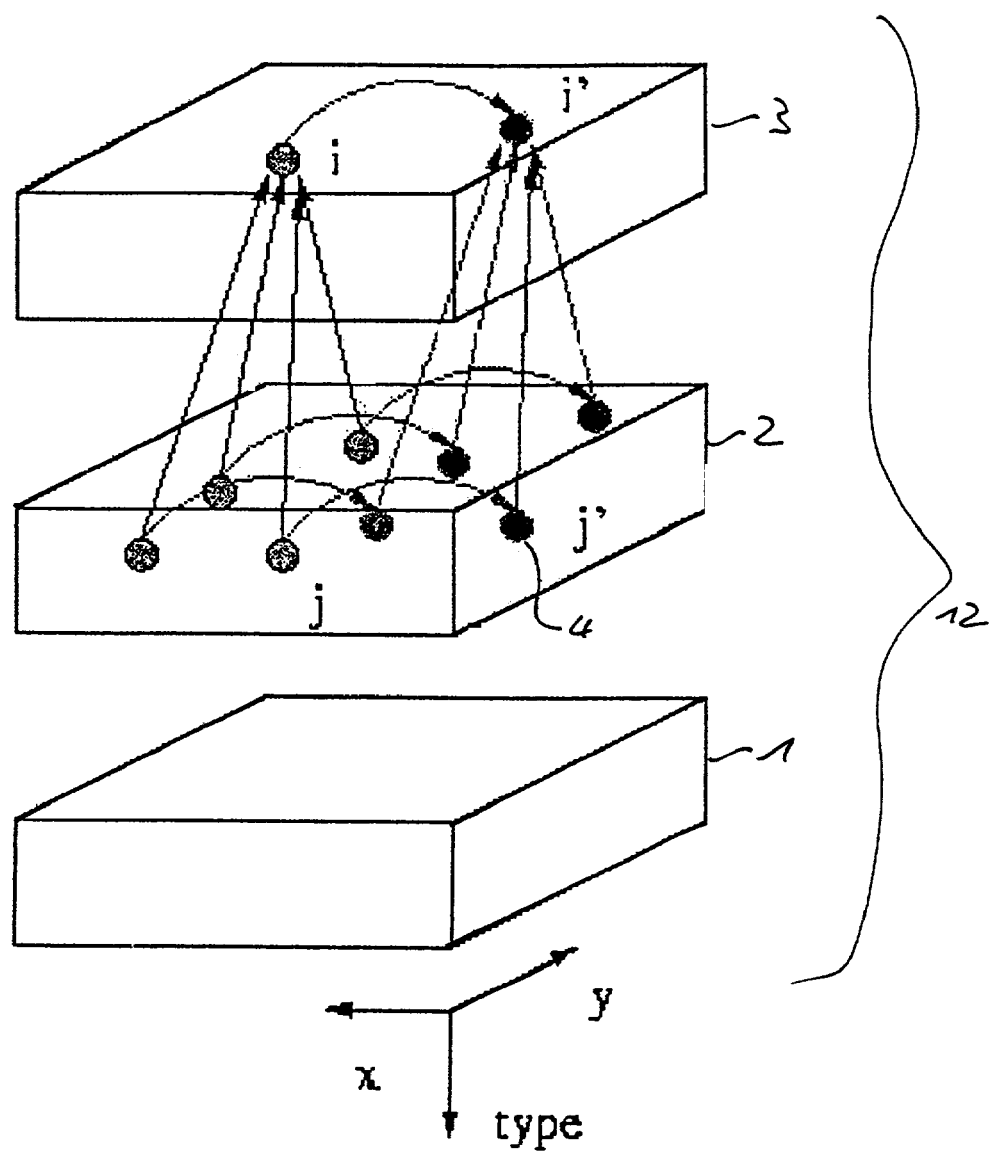
FIG. 1 shows schematically a translationally invariant convolutional network.

The neuronal indices can be separated into source and target type indices $k, l$ and type-dependent neuronal indices $i, j$, with $T_m$ being the set of all neurons of a given type $m$, so that $i \epsilon T_k$ and $j \epsilon T_l$. It is assumed that the connection type is uniquely determined by the pair $k; l$ of the corresponding source and target neuron types, so that sum of Eq. (1) can be divided into groups of connections of the same type, $$h^k_{i \epsilon T_k}(t) = \sum_l \left( \sum_{j \epsilon T_l} J^{k;l}_{i,j} A^l_j(t) \right) \tag{2}$$

in case that for fixed types $k, l$ the relative input connectivity pattern repeats along the neurons $i, j$, so that $J^{k;l}_{i,j}$ is the same for every pair of neurons $i \epsilon T_k$ and $j \epsilon T_l$ that undergo a common index shift by $t$ so that $i \rightarrow i+t$ ($i'$ in FIG. 1) and $j \rightarrow j+t$ ($=j'$ in FIG. 1).

This represents a translational invariance over the features sampled in a discrete fashion by the indices $i, j$, $$J_{i,j}^{k;l} = J_{i+t,j+t}^{k;l} = J_{0,j-i}^{k;l} \tag{3}$$

Equation (2) can be written using a discrete convolution $\tilde{A}_i^{k;l}(t)$ (which now is a function of $i$) of the input contributions $A_j^l(t)$ $$h_i^k(t) = \sum_l \sum_{j \epsilon T_l} J^{k;l}_{0;j-i} A^l_j(t) = \sum_l \tilde{A}_i^{k;l}(t) \tag{4}$$

In fact, a number of neural networks that can be denominated as "convolutional networks" (12 in FIG. 1) or "weight-sharing networks" make use of this particular property. Weight-sharing greatly reduces the number of independent parameters and helps to make such networks tractable. Moreover, the repetitive use of the same weight matrix $J_{0;j-i}^{k;l}$ for different neurons $i, j$ (but fixed types $k, l$) means that learning occurs virtually for all neurons of a fixed type (which all have the same weight matrix) simultaneously.

Given that convolutional or weight-sharing techniques can be used to describe the linear components of the neuronal calculations for a large number of neural network models, it is proposed to exploit this property by using Fourier techniques to calculate the convolutions $\tilde{A}_i^{k;l}(t)$, $\tilde{I}_{x',y'}^{\theta'}(t)$ or $\tilde{A}_{x'',y''}^{\theta'',\theta'}(t)$. A difficulty to be overcome thereby is that the convolution kernels $J_{i,j}^{k;l}$ have to be stored somewhere for every combination of $k$'s and $l$'s (i.e., for every connection type $k; l$), and this can result in very large number of kernels for increasing number and dimensionality of type parameters.

In the present example with the simple kernel $J_{0,0;x'-x'',y'-y''}^{\theta'',\theta'}$, if there is a descretization into $n''$ orientations labeled by $\theta''$ and $n'$ orientations labeled by $\theta'$ in the different areas this means that $n''$ by $n'$ filters have to be stored and the corresponding calculation with these filters has to be performed during each simulation step.

A solution for the huge number of filters according to the present invention is to factorize the filters. Starting again with Eq. (2)

$$h_i^k(t) = \sum_l \left( \sum_{j \epsilon T_l} J^{k;l}_{i,j} A^l_j(t) \right) \tag{7}$$

and now take into account that in case of convolutional networks, for a specific type of connections (defined by fixed $k, l$), the source and the target neurons can be characterized each by their own particular filters $G_i^k$ and $G_j^l$ (not to be mixed up with the general connectivity kernel $J_{i,j}^{k;l}$) which depend on the type parameters $k$ and $l$ of the source and the target neuron and receive as running parameters the indices $i, j$.

The general connectivity kernel $J_{i,j}^{k;l}$ is assumed to be translationally invariant as before, with the addition that a scaling function $i \rightarrow j, j=L(i)$ acts as an "interface" between the two indices $i$ and $j$, with the purpose to make them comparable. This means that the condition of translational invariance now may include increments of $i$ and $j$ steps of different size $n_i$ and $n_j=L(n_i)$, so that $$J_{i,j}^{k;l} = J_{i+n_i,j+n_j}^{k;l} = J_{0,j-L(i)}^{k;l} \tag{8}$$

Of course, L should be chosen to be a sensible function, e.g., if natural numbers of the indices i, j are used, L should return natural numbers as well.

The source and the target filter $G_i^k$ and $G_j^l$ can be used to describe and to factorize the general connectivity kernel in a way such that the translational invariance (Equ. 8) is maintained. To achieve this, the filters are designed to be functions over an additional space X characterized by a variable $x \in X$, and that $$J_{i,j}^{k,l} := \int_{-\infty}^{\infty} dx G_i^k(x) G_j^l(x) := \langle G_i^k(x) | G_j^l(x) \rangle_x \quad (9)$$

To achieve the required translational invariance over the indices i and j, it is assumed that there is a linear function $j \to x, x = M(j)$, and that $$G_i^k(x) := F^k\{x - M[L(i)]\}$$

$$G_j^l(x) := F^l[x - M(j)] \quad (10)$$

This leads to the result $$J_{i,j}^{k,l} := \int_{-\infty}^{\infty} dx F^l\{x - M[L(i)]\} F^k[x - M(j)] \quad (11)$$

meaning that the connectivity kernel is given (or generated) by the scalar product of two filters centered around the neuron-dependent positions $x_i := M[L(i)]$ and $x_j := M(j)$ in a common space x.

The translation invariance can be checked for:

$$J_{i,j}^{k,l} := \int_{-\infty}^{\infty} dx F^k(x - x_i) F^l(x - x_j) \quad (12)$$

$$= \int_{-\infty}^{\infty} dx F^k(x - x_i - x_i) F^l(x - x_j - x_i)$$

$$= \int_{-\infty}^{\infty} dx F^k\{x - M[L(0)]\} F^l\{x - M(j) - M[L(i)]\}$$

$$= \int_{-\infty}^{\infty} dx F^k\{x - M[L(0)]\} F^l\{x - M[j - L(i)]\}$$

$$= J_{0,j-L(i)}^{k,l}$$

since a common shift of the source and the target filter does not change the outcome of the scalar product. The connectivity matrix is now factorized and, moreover, any desired connectivity matrix is generated taking advantage of the additional degrees of freedom introduced by the filters $G_i^k(x)$ and $G_j^l(x)$.

The advantages of the concept are evident:
  The combinatorial problem of convolutional networks is avoided, as instead of n'' by n' filters, n'' plus n' filters need to be stored and processed.
  The source data that is passed by a certain type of connections can be visualized and interpreted using the reconstruction image R(x;t).
  One can analyze the filters and understand how they interact with the source data since the filter and the reconstruction image operate in the same space.

The concept of the present invention implies that the message passing from the entire group of source neurons (same type) to the entire group of target neurons (again of the same type) can be understood as an encoding/decoding process, with a reconstruction image (that can be used for visualization purposes) in between, which will now be explained with reference to FIG. 3:

The activity $A_j(t)$ of the source neurons $j \in T_l$ (type l) of the source layer 7 is used together with the encoding filters 10 $G_j^l(x)$ to compose a reconstruction image 9 R(x,t). This is a linear composition of the encoding filters 10 weighted by the respective activity of the neurons of the source layer 3.
  The contribution to the i'th, $i \in T_k$ (type k) target neuron's synaptic input field of those particular source neurons j is gained by a convolution of the reconstruction image 9 with the corresponding decoding filter 11 $G_i^k(x)$.
  After the total synaptic input field (which may include many contributions from other connections) of the neuron i (4 in FIG. 2) of the target layer 8 has been calculated (5 in FIG. 2), the nonlinear processing steps (6 in FIG. 2) of the local neuronal dynamics apply.
  These three steps repeat for every possible connection type that can be identified within the network.

Since the calculation of the synaptic field only makes use of a convolution the Fourier convolution theorem can be used to simplify the calculation. In particular FFT techniques can be used. Contrary to the case of translationally-invariant connectivity structures, Fourier techniques make sense for the proposed technique, since not convolution kernels for every combination of k's and l's, but only for all k's and all l's need to be stored. For the calculation of the synaptic field between areas this means that instead of using n''*n' filters, only need n''+n' of them are needed.

The other necessary calculations that take place in standard convolutional networks can also be written using convolutions and linear componentwise additions in the X-space as will be shown in the following. The reconstruction image from Eq. 15 can be written using Eq. 10 as $$R(x, t) = \sum_l \left( \sum_{j \in T_l} A_j^l(t) F^l(x - x_j) \right) \quad (17)$$

$$= \sum_l \left( \sum_{j \in T_l} A_j^l(t) \langle \delta(x' - x_j) | F^l(x - x') \rangle_{x'} \right)$$

$$= \sum_l \left\langle \left( \sum_{j \in T_l} A_j^l(t) \delta(x' - x_j) \right) \middle| F^l(x - x') \right\rangle$$

$$= \sum_l \langle a^l(x'; t) | F^l(x - x') \rangle_{x'}$$

$$= \sum_l r^l(x; t)$$

with the partial source reconstruction images $$r^l(x;t) = \langle a^l(x';t) | F^l(x-x') \rangle_{x'} \quad (18)$$

and the partial activity images $$a^l(x; t) := \sum_{j \in T_l} A_j^l(t) \delta(x - x_j) \quad (19)$$

for each type of source neurons l.

The calculation of the contribution of the reconstruction image R(x;t) to the synaptic input field is even easier, because Eq. (16) can be used directly, which means the target filter $F_t^k(x)$ is convoluted with the source reconstruction image $R(x;t)$, $$H^k(x,t) = <F^k(x'-x)|R(x';t)>_{x'} \quad (20)$$

and the convolution at the target unit position $x_i$ is evaluated, $$h_i^k(t) = H^k(x,t)|_{x=x_i} \quad (21)$$

Figure 4:
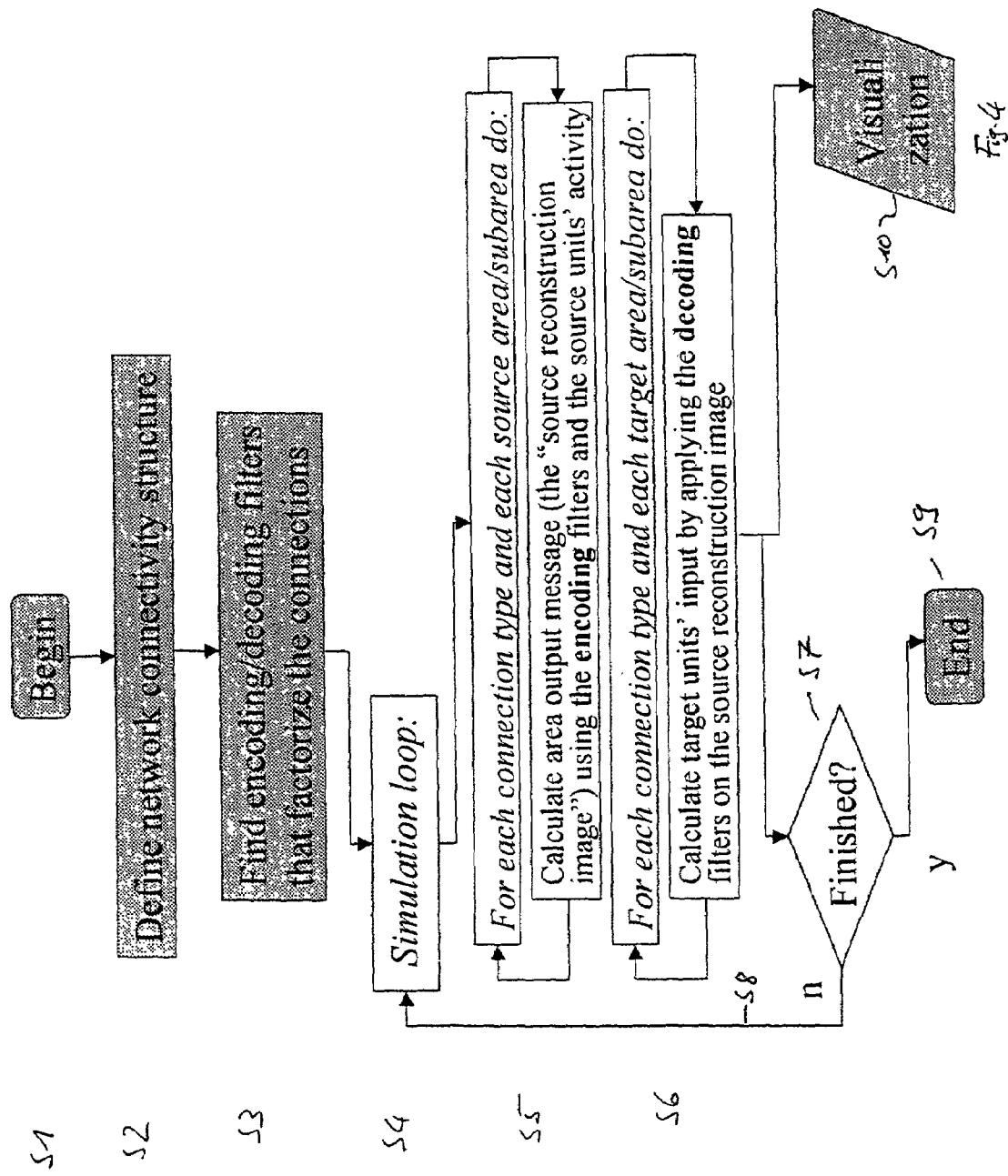
FIG. 4 shows a flowchart representing the processing proposed by the present invention.

A possible implementation of the present invention will now be explained with reference to FIG. 4.

After the beginning of the processing in step S1, the network connectivity structure is defined in a step S2. Along with this definition step S2 the encoding/decoding filters that factorize the connection have to be found. After this step S3 a simulation loop S4 starts. At first for each connection type and each source area/sub-area a source reconstruction image is calculated using the encoding filters and the source layers' activity. In this step S5 therefore the encoding filters are used together with the source layers' activities of the processing area (sub-area) to gain the source reconstruction image. This image is then passed onto a target area, requiring low communication bandwidth. In a step S6 the target layer's input is then calculated by simply applying the decoding filter on the source reconstruction image. These two steps S5 and S6 can be implemented independently of each other, so that they can be easily paralleled. In addition, the calculation only involve matrix element operations and discrete Fourier transformations, which makes the system easy to be implemented in hardware. The simulation loop is traversed for the time the dynamics of the network should be CAD running. During this time in a step S7 it is decided that the processing is not yet finished and therefore the procedure goes back to the simulation start step S4 in a step S8. Otherwise the processing stops in a step S9.

The source reconstruction image comprises in the most compact form the information that the target receives from the source area. Therefore, if the encoding and decoding filters are chosen in some intuitive space (such as for example a two-dimensional space for visual processing), the source reconstruction image can be used in a step S10 for a visualization of the communication along the network.

Figure 5:
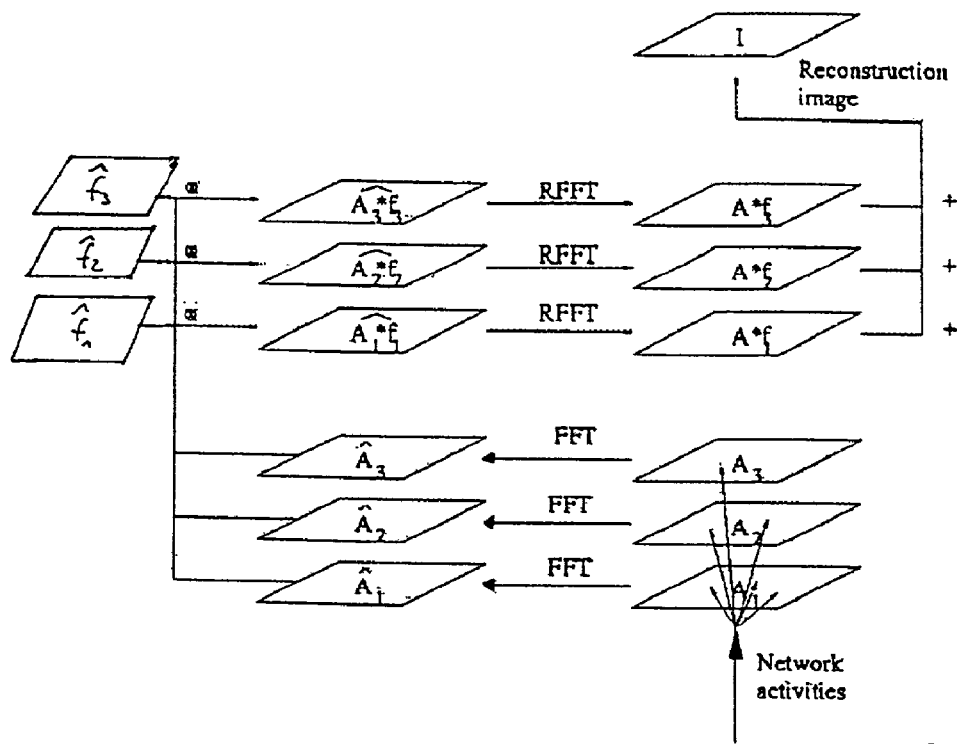
FIG. 5 shows the calculation of a reconstruction image based on network activities (encoding step)

FIG. 5 shows how the network activities of different sub-areas $A_1, A_2, A_3$ are converted to a reconstruction image. At first all of the sub-areas $A_1, A_2, A_3$ representing together the activity of a source layer are FFT converted to generate FFT converted activities $\hat{A}_1, \hat{A}_2, \hat{A}_3$. These FFT converted network activities are then convoluted with the corresponding encoding filters $\hat{f}_1, \hat{f}_2, \hat{f}_3$. The resulting scalar product is inverse FFT processed, wherein the combinations of the result of the different inverse FFT conversation is composed to generate the reconstruction image I.

Figure 6:
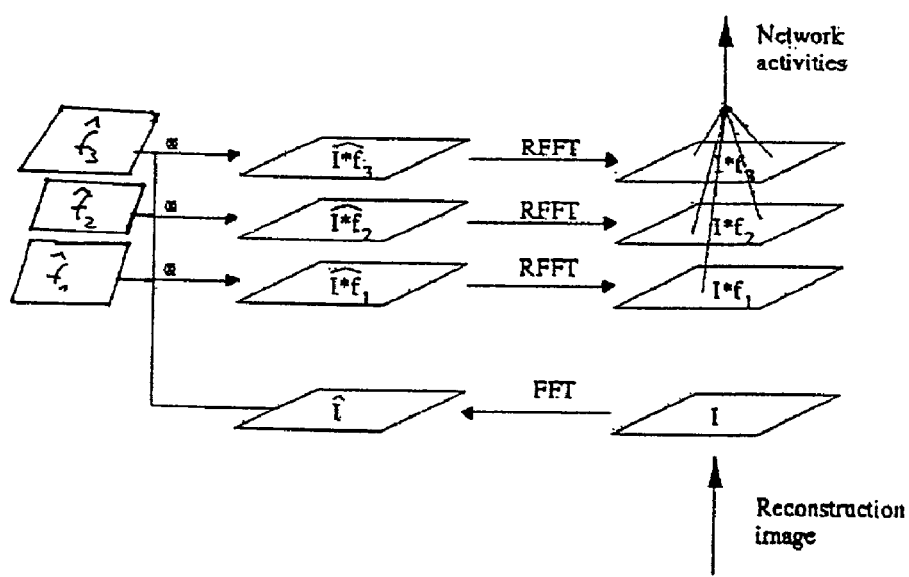
FIG. 6 shows the calculation of network activities on the basis of a reconstruction image (decoding step).

FIG. 6 shows how network activities can be generated on the basis of a reconstruction image which corresponds to the decoding step as set forth above. At first a reconstruction image I is FFT converted Î. Then the reconstruction image is multiplied with each decoding filter $\hat{f}_1, \hat{f}_2, \hat{f}_3$ and the scalar product thus generated and inverse Fourier converted (RFFT). The combination of the thus generated sub-area activities all together represent the network activity of a target layer.

To summarize the present invention, the weight matrix describing a connection between two layers of a convolutional network is written as a scalar product of two filters extending in an additional space, which is usually chosen to be the space along which the weight matrix shows its translational invariance. From the factorization and the linearity assumption for the driving input it follows that the process of communicating the driving signal from one layer (source layer) to the next layer (target layer) can be decomposed into an encoding and a decoding step.

A typical application of the present invention is the recognition of (f.e. acoustical or visual) patterns, which in turn can be used f.e. for robots.

The advantages of the present invention can be summarized as follows:

The use of Fourier transformation throughout the calculation of the entire network dynamics, and not only the first, input layer enables the use of optimized laboratories and hardware for the computation of the simulations.

The reduced communication overhead between different layers of the network allows for a parallelization of the network dynamics computation.

The connection between higher layers can be designed intuitively as encoding and decoding filters on a common working space (for visual processing usually the 2D retinotopic coordinates x, y).

What is claimed is:

1. A computerized method for simulating a convolutional network behavior, wherein the convolutional network is defined by a set of layers, wherein each layer comprises a two-dimensional lattice of neurons, wherein each layer with the exception of a last layer of said set of layers represents a source layer for a respectively following target layer, wherein a plurality of neurons of each of said source layer called a source sub-area share the identical connectivity weight matrix type, comprising the steps of:

decomposing each connectivity weight matrix type in an encoding filter and a decoding filter wherein each connectivity weight matrix type is represented by a scalar product of an encoding filter and a decoding filter;

determining a source reconstruction image on the basis of the encoding filters and the activities of the source layer; and outputting a first input of the target layer, wherein said first input is a convolution of the source reconstruction image and the decoding filters.

2. The method of claim 1, wherein said calculating the source reconstruction image includes the steps of:

identifying a scalar product of each of the source sub-areas and the corresponding encoding filter, and combining the results of said scalar products of all source sub-areas.

3. The method of claim 2, wherein the encoding filters and decoding filters are preset or generated by a learning process.

4. The method of claim 3, wherein the encoding filter step and the decoding filter step are performed using a Fast Fourier Transformation.

5. The method of claim 4, wherein the encoding filters and decoding filters extend along an axis along which the corresponding connectivity weight matrix type presents a translational invariance.

6. The method of claim 5, further comprising the step of identifying internal states of a network characterized in that the internal states of the network are identified by one source reconstruction image for each connection between a source layer and a following target layer, the source reconstruction images being calculated on the basis of the encoding filters and the activities of the corresponding source layer.

7. The method of claim 6, further comprising the step of calculating each source reconstruction image, including the steps of:
  determining the scalar product of each of the source sub-areas of the source layer and the corresponding encoding filter, and
  combining the results of the scalar products of all source sub-areas.

8. The method of claim 7, wherein said method is used to recognize a pattern.

9. The method of claim 1, wherein the encoding filters and decoding filters are preset or generated by a learning process.

10. The method of claim 9, wherein the encoding filter step and the decoding filter step are performed using a Fast Fourier Transformation.

11. The method of claim 10, wherein the encoding filters and decoding filters extend along an axis along which the corresponding connectivity weight matrix type presents a translational invariance.

12. The method of claim 11, further comprising the step of identifying internal states of a network characterized in that the internal states of the network are identified by one source reconstruction image for each connection between a source layer and a following target layer, the source reconstruction images being calculated on the basis of the encoding filters and the activities of the corresponding source layer.

13. The method of claim 12, further comprising the step of calculating each source reconstruction image, including the steps of:
  determining the scalar product of each of the source sub-areas of the source layer and the corresponding encoding filter, and
  combining the results of the scalar products of all source sub-areas.

14. The method of claim 13, wherein said method is used to recognize a pattern.

15. The method of claim 1, wherein said method is used to recognize a pattern, wherein said pattern is a representation of at least one of an acoustical characteristic or a visual characteristic of a physical object, said method further comprising the step of outputting said recognized pattern.

16. A computer program stored in a computer readable medium for performing the method of claim 1.

17. A computerized method for the determining activities of target layers in a convolutional network behavior, wherein the convolutional network is defined by a set of layers, wherein each layer comprises a two-dimensional lattice of neurons, wherein each layer, with the exception of the last layer of said set of layers, represents a source layer for a respectively following target layer, and wherein a plurality of neurons of a source layer, called a source sub-area, share the identical connectivity weight matrix type, the method comprising the steps of:
  representing each connectivity weight matrix type by a scalar product of an encoding filter and a decoding filter,
  determining a source reconstruction image on the basis of the corresponding encoding filters and the activities of the corresponding source sub-area, for each source layer;
  determining the input of the target layer as a convolution of the source reconstruction image and the decoding filter, for each connectivity weight matrix type, for each target sub-area and for each target layer;
  determining the activities of the target layer in response to the activities of the source layer by using a response function of the neurons of the target layer and the calculated input of the target layer, for each target area; and
  outputting the activities of the target layer.

18. The method of claim 17, wherein each source reconstruction image is calculated by the following steps:
  determining the scalar product of each of the source sub-areas of the corresponding source layer and the corresponding encoding filter, and
  combining the results of the scalar products of all source sub-areas.

19. A computer program stored in a computer readable medium for performing the method of claim 17.

20. The method of claim 17, wherein said method is used to recognize a pattern, wherein said pattern is a representation of at least one of an acoustical characteristic or a visual characteristic of a physical object, said method further comprising the step of outputting said recognized pattern.

21. A computerized method for simulating a convolutional network behavior, wherein the convolutional network consists of a set of layers, wherein each layer includes a two-dimensional lattice of neurons, wherein each layer with the exception of a last layer of said set of layers represents a source layer for a respectively following target layer, the method comprising the steps of:
  applying a connectivity weight matrix on activities of the source layer to determine a plurality of neurons of each of a source layer neurons, having the steps of:
    convolving the activities of the source layer with an encoding filter to generate a source reconstruction image, and
    determining a target layer input to the target layer by convolving the source reconstruction image with a decoding filter; and
  outputting said target layer input to said target layer.

22. The method of claim 21, wherein said method is used to recognize a pattern, wherein said pattern is a representation of at least one of an acoustical characteristic or a visual characteristic of a physical object, said method further comprising the step of outputting said recognized pattern.

23. A computer program stored in a computer readable medium for performing the method of claim 21.

24. A computerized method for determining activities of target layers in a convolutional network behavior,
  wherein said convolutional network includes data representing a pattern wherein said pattern is a representation of at least one of an acoustic characteristic and a visual characteristic of a physical object;
  wherein a convolutional network is defined by a set of layers, wherein each layer is made up by a two-dimensional lattice of neurons, wherein each layer, except for a last layer of said set of layers, represents the source layer for a respectively following target layer, wherein a plurality of neurons of each source layer called a source sub-area share an identical connectivity weight matrix type, the method comprising the steps of:
  decomposing each connectivity weight matrix type into an encoding filter and a decoding filter,
  determining a source reconstruction image based upon corresponding encoding filters and activities of at least one of the corresponding source sub-area or source layer, determining an input of the target layer as a convolution of the source reconstruction image and the decoding filter, for each connectivity weight matrix type, for each target sub area and for each target layer;

determining activities of the target layer in response to the activities of the source layer by using a response function of the neurons of the target layer and the input of the target layer, for each target area; and outputting said activities of the target layer.

25. The method of claim 24, wherein said method is used to recognize a pattern, wherein said pattern is a representation of at least one of an acoustical characteristic or a visual characteristic of a physical object, said method further comprising the step of outputting said recognized pattern.

26. A computer program stored in a computer readable medium for performing the method of claim 24.

* * * * *